US010974434B2

(12) United States Patent
Goldenstein et al.

(10) Patent No.: US 10,974,434 B2
(45) Date of Patent: Apr. 13, 2021

(54) DEVICE AND METHOD FOR COOLING A BLOWN FILM

(71) Applicant: Windmöller & Hölscher KG, Lengerich (DE)

(72) Inventors: Jens Goldenstein, Lengerich (DE); Henning Steuter, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 189 days.

(21) Appl. No.: 15/580,542

(22) PCT Filed: Jun. 8, 2016

(86) PCT No.: PCT/EP2016/063074
§ 371 (c)(1),
(2) Date: Dec. 7, 2017

(87) PCT Pub. No.: WO2016/198477
PCT Pub. Date: Dec. 15, 2016

(65) Prior Publication Data
US 2019/0118451 A1 Apr. 25, 2019

(30) Foreign Application Priority Data

Jun. 8, 2015 (DE) .......................... 102015210468.0

(51) Int. Cl.
*B29C 48/90* (2019.01)
*B29C 55/28* (2006.01)
(Continued)

(52) U.S. Cl.
CPC ........ *B29C 48/907* (2019.02); *B29C 48/0018* (2019.02); *B29C 48/10* (2019.02);
(Continued)

(58) Field of Classification Search
CPC ... B29C 48/903; B29C 48/907; B29C 48/908; B29C 48/913
See application file for complete search history.

(56) References Cited

U.S. PATENT DOCUMENTS 3,622,657 A * 11/1971 North ................ B29C 48/10
264/39
3,775,523 A * 11/1973 Haley ................ B29C 48/913
264/569

(Continued)

FOREIGN PATENT DOCUMENTS

| CN | 1030544 A | 1/1989 |
| CN | 1700976 A | 11/2005 |

(Continued)

OTHER PUBLICATIONS

PCT Notification of Transmittal of Translation of the International Preliminary Report of Patentability dated Dec. 14, 2017, issued for PCT Application No. PCT/EP2016/063074, as well as the English translation document, 8 pages.

*Primary Examiner* — Marc C Howell
*Assistant Examiner* — Nicholas J Chidiac
(74) *Attorney, Agent, or Firm* — Peter W. Schroen; Bret E. Field; Bozicevic, Field & Francis LLP (57) ABSTRACT

The invention relates to a calibration device (1) for calibrating a blown film (6), said device comprising; —a tubular region (55) with at least one inner wall (92), through which region the blown film (6) can be passed; —a liquid reservoir which provides a liquid and which is situated above the tubular region (55); an inlet region, in which the liquid can be introduced into the space between the outer wall of the blown film (6) and the inner wall (92) of the tubular region (55); and —a scraper device (117), situated below the tubular region (55), by means of which scraper device at least part of the liquid can be removed from the outer (Continued)

surface. The distance of the liquid-removing regions of the scraper device (117) from the main axis of the blown film (6) can be altered.

15 Claims, 5 Drawing Sheets (51) Int. Cl.
  *B29C 48/92* (2019.01)
  *B29C 48/10* (2019.01)
  *B29C 48/88* (2019.01)
  *B29C 48/00* (2019.01)

(52) U.S. Cl.
  CPC .......... *B29C 48/903* (2019.02); *B29C 48/908* (2019.02); *B29C 48/913* (2019.02); *B29C 48/92* (2019.02); *B29C 55/28* (2013.01); *B29C 2948/92619* (2019.02); *B29C 2948/92923* (2019.02)

(56) References Cited

U.S. PATENT DOCUMENTS

| | | | |
|---|---|---|---|
| 3,821,343 A | | 6/1974 | Sudo |
| 3,958,913 A | * | 5/1976 | Stangl ............... B29C 48/10 425/445 |
| 3,980,418 A | * | 9/1976 | Schott, Jr. ............ B29C 48/10 425/72.1 |
| 4,408,970 A | * | 10/1983 | Bustin ............... B29C 48/10 425/72.1 |
| 4,793,790 A | * | 12/1988 | Reinhold ........... B29C 48/903 425/325 |
| 5,441,395 A | * | 8/1995 | Planeta ............... B29C 48/10 425/72.1 |
| 5,731,909 A | * | 3/1998 | Schachar ........... G02B 26/0875 359/676 |
| 5,774,274 A | * | 6/1998 | Schachar ............ F03G 7/065 359/666 |
| 6,038,080 A | * | 3/2000 | Schachar ............ G02B 3/14 359/666 |
| 6,246,528 B1 | * | 6/2001 | Schachar ............ F03G 7/06 359/666 |
| 6,493,151 B2 | * | 12/2002 | Schachar ............ F03G 7/06 359/666 |
| 6,721,104 B2 | * | 4/2004 | Schachar ............ G02B 3/14 359/666 |
| 6,930,838 B2 | * | 8/2005 | Schachar ............ F03G 7/06 359/676 |
| 9,889,593 B2 | * | 2/2018 | Goldenstein ........ B29C 48/08 |
| 2001/0040735 A1 | * | 11/2001 | Schachar ........... G02B 26/0875 359/665 |
| 2004/0008419 A1 | * | 1/2004 | Schachar ............ F03G 7/065 359/666 |
| 2009/0304840 A1 | * | 12/2009 | Frische ............... B29C 48/92 425/150 |
| 2013/0161852 A1 | * | 6/2013 | Goldenstein ........ B29D 23/00 264/40.1 |

FOREIGN PATENT DOCUMENTS

| | | |
|---|---|---|
| CN | 103502098 A | 1/2014 |
| DE | 1937978 A1 | 4/1970 |
| DE | 19608522 A1 | 9/1997 |
| DE | 10160321 A1 | 6/2003 |
| JP | S49-5739 B1 | 2/1974 |
| JP | H02-128827 A | 5/1990 |
| JP | H02128827 U * | 10/1990 |
| WO | WO2012032128 A1 | 3/2012 |
| WO | WO2012159233 A1 | 11/2012 |

* cited by examiner

DEVICE AND METHOD FOR COOLING A BLOWN FILM

The invention relates to a device for cooling a blown film according to the generic part of claim 1 and to a method according to the generic part of claim 16.

A blown film such as is produced with a blown film layout is as a rule subsequently cooled off and also calibrated so that it has a uniform diameter. In order to generate certain qualities, the blown film can be cooled off especially rapidly with a liquid. Here the blown film is extruded as a rule in the direction of gravity. The blown film frequently consists here of plastic.

A cooling device provided to this end comprises a device for applying liquid on the outer wall of the blown film. The cooling with liquid removes a part of the heat from the blown film more rapidly than would be possible with a gas. The liquid applied onto the blown film is as a rule removed again as completely as possible before the blown film is further processed, in particular in a winding device. To this end a device for removing the liquid by suction is often provided.

WO 2011/058072 A1 discloses such a device and a method for cooling a blown film, wherein a suction removal device is comprised for removing the cooling liquid by suction and which has an inside surface which comprises a liquid-permeable element. On the one hand the water is removed by suction with it and on the other hand the film is also held fast, since it could be torn due to gravity given certain materials. Another device is provided on the lower edge of the suction removal device and with which even the remaining liquid can be removed. This device operates according to the principle of an air-blocking seal, wherein the blown film is loaded with a gas standing under a superpressure so that the remaining liquid is forced back in the direction of the suction removal device.

A calibration device designed to this end comprises as a rule a tubular region with at least one inside wall through which the blown film can be passed. The blown film is as a rule rotationally symmetrical here, wherein the direction of transport and the axis of symmetry are usually parallel to one another. The axis of symmetry substantially coincides here with the main inertial axis of the blown film inside the calibration device. The main inertial axis is also designated in the following in brief as the main axis.

The calibration device furthermore comprises a liquid reservoir which provides the liquid and which is situated above the tubular region. This liquid is preferably water, for which reason water is also frequently used in the following as a synonym for the liquid. The liquid passes into an inlet region in the space between the outer wall of the blown film and the inner wall of the tubular region. On the one hand the blown film is rapidly cooled off due to the often high thermal capacity of the liquid and on the other hand it is avoided that the blown film makes contact with the inner wall of the tubular region. Finally, a scraper device is arranged underneath the tubular region with which device at least a part of the liquid can be removed from the outer surface so that the further processing of the blown film is not negatively influenced by the liquid. The removal of the liquid can be compared here to the brushing off or drawing off of a liquid from a smooth surface such as a windshield wiper of a motor vehicle or a squeegee for cleaning windows.

However, it can occur that in spite of a calibration the dimensions of the blown film are altered upon exiting from the calibration device so that the scraper device can no longer completely perform its action. In particular, it is often even desirable to be able to alter the diameter of the blown film.

Therefore, the present invention has the problem of further developing a device and a method for cooling a blown film in such a manner that even under different operation situations the liquid is removed by suction as reliably as possible from the outer surface of the blown film.

This problem is solved according to the invention by all features of claim 1. Possible embodiments of the invention are indicated in the dependent claims.

The present invention provides that the distance which the removal element has from the main axis of the blown film can be altered. Therefore, if an alteration in the format of the blown film should result, the removal element can then be adjusted in such a manner that subsequently the liquid continues to be removed as completely as possible from the outer surface of the blown film and that no damage to the blown film must be accepted. The removal element of the present invention is designed to reliably remove residual liquid which is often still present in the case of a suction removal device.

Water is especially preferred as liquid since it can be readily managed.

In an advantageous embodiment of the invention the adjustment region, that is, the region in which the distance of the removal element from the main axis of the films can be adjusted is preferably at least +/−10 mm and/or up to +/−500 mm.

It is advantageous if the device for the application of liquid comprises at least one film guide element with at least one inner wall which element is arranged at least partially around the blown film and along which the blown film can be guided. In other words, the blown film is guided with a film guide element while it is being loaded with the liquid. In particular, this makes it possible to channel the liquid and keep it close to the blown film so that only a liquid film is necessary for the cooling. A loss of liquid by any water sprays being produced is avoided. At the same time it is avoided by the invention that the blown film touches the film guide element so that damage to the blown film occurs to a lesser degree.

A single or a plurality of such film guide elements surrounding the blown film can also serve to calibrate the blown film The one film guide element or the plurality of film guide elements often form/s a tubular region with at least one inwardly directed wall, i.e., directed in the direction of the blown film, through which the blown film can be passed. The blown film is as a rule rotationally symmetrical here, wherein the direction of transport and the axis of symmetry are parallel to one another. The axis of symmetry substantially coincides with the main inertial axis of the blown film inside the calibration device. The main inertial axis is also designated in brief in the following as the main axis.

Thus, a calibration device is disclosed in WO 2012/032128 A1 which can be adapted to an alteration of the format of the blown film in wide regions. The present invention can therefore be especially advantageously combined with a calibration device according to WO 2012/032128 A1. The disclosure of a format-variable calibration device in it is also included herewith in this patent application. The distance which the liquid-permeable element has from the main axis of the blown film can be adjusted between a minimum distance and a maximum distance, wherein the maximum distance is preferably 1.2 times the minimum distance A device according to the invention, in particular in a blown film layout according to the invention provides that the blown film can be loaded from within with a pressure so that the blown film expands in a radial direction in comparison to its diameter which it has during the extrusion from an annular nozzle. As a result of this pressure, which is in particular a superpressure, the blown film is pressed against the film guide element, which then provides a counterforce. The radial expansion is designated as a rule as the inflation ratio, which is 1.1 to 3 in conjunction with the cooling device according to the invention. This means that the diameter of the blown film is increased by 10% to 200% relative to the diameter of the annular nozzle.

It is preferred here if a liquid reservoir is provided in the upper area of the film guide element with which the liquid can be provided, wherein in particular the liquid can be conducted between the film guide element and the blown film (6). In particular, the inlet region of the film guide element can form the liquid reservoir for the blown film so that no independent device is necessary. This saves expense. In addition, this creates a compact unit which makes do with the smallest possible overall height.

An embodiment of the invention provides that, viewed in the direction of transport of the blown film, a suction removal device is arranged between the at least one film guide element and the removal element with which the liquid can be removed at least partially from the outer wall of the blown film. In other words, the section removal device removes a large part of the liquid while the removal element removes the remaining remainder of the liquid as completely as possible. The removal element preferably additionally forms a seal of the suction removal device so that the suction removal device takes in no or the least possible ambient air.

It is advantageous, especially in conjunction with the cited suction removal device, if the liquid is removed on the top of the removal element. The flowoff of the liquid of the suction removal device can be used at the same time for the flowoff of the liquid collected by the removal element.

The at least one removal element itself can be an air blower, a slot blower or also an air-blocking seal.

If the film guide element and/or the suction removal device can be adapted to the diameter of the blown film, it is advantageous if the removal element can be adjusted in its distance from the main axis of the blown film synchronously with one or both of these devices. To this end a mechanical and/or electronic coupling of the movements can be provided.

However, it is also advantageous if the distance of the removal element can also be adjusted independently of the film guide element and/or of the suction removal element in order, for example, to be able to carry out an adaptation which compensates, for example, the wearer, compensates a relaxation of the material of the removal element or also offers an adaptation to the material of the blown film.

To this end it is especially advantageous to provide a measuring device for measuring the position of the removal element, in particular of its inner edge.

In an especially preferred embodiment of the present invention the at least one removal element comprises a circumferential, uninterrupted edge, wherein the edge faces the outer surface of the blown film and preferably rests on the latter. The liquid can be reliably removed over the entire circumference with a circumferential edge without the generation of slots or gaps in which this is not the case. In general, a linear contact between the removal element and the blown film is preferred. In this manner the remaining liquid can be reliably removed or even scraped off without the blown film suffering damage. Instead of a contact, a slight distance less than 10 mm, preferably less than 1 mm, in particular less than 0.5 mm can be provided between the circumferential edge and the blown film. In this case a small part of the remaining liquid can form a sliding film between the edge and the blown film, in contrast to which a part of the residual fluid which formed drops is removed. This almost entirely avoids damage to the blown film. The distance is preferably selected in such a manner that the remaining liquid film evaporates during a brief further transport stretch of the blown film. If needed, an evaporation device, for example, a heat radiator, can be provided for supporting the evaporation.

In particular in the case of insensitive blown films it can be provided that the diameter of the circle which the edge circumscribes is smaller than the nominal diameter of the film bubble. In other words, the removal element is pressed into the blown film in order to be able to reliably and completely remove the remaining liquid.

In order to generally reduce the friction between the removal element and the blown film, it can be provided that the removal element is coated with one of the following materials, comprises one of the following materials or one of the following materials is supplied permanently or at intervals:
  graphite
  silicone
  Teflon
  rubber
  smearing film It is especially advantageous to provide an annular, flat strip of an elastic material. This strip is preferably arranged in a plane running orthogonally to the main axis of the blown film. Therefore, the inner edge of this strip assumes the brushing-off function. To this end the using of an elastic material is advantageous. The inner edge and the outer edge of this flat strip are preferably circular and concentric in the relaxed state, wherein the outside diameter is advantageously at least 1.5 times that of the inside diameter. In general, the width of the strip can be greater than 10 mm, preferably greater than 70 mm in order to obtain an inner edge which is as circular as possible. The strip can be in one part and can also be homogeneous. Such a strip can be readily influenced in such a manner by applying forces comprising a radial component relative to the brushing-off device that the cited distance between the main axis and the brushing-off element can be altered, which will be subsequently described in detail using different exemplary embodiments. It is provided that the inside edge substantially always has a circular shape. In particular, it can be provided that radially outwardly directed forces attack discrete points of the outer edge, wherein these forces even out due to the elasticity of the removal element and ensure a circular inner edge. The number of the cited discrete points is a function of the width, the adjustment region and/or of the material qualities of the removal element so that a concrete number cannot be indicated.

It is advantageous if the adjustment region, that is, the possible changing of the inside diameter is greater than 20 mm, in particular greater than 100 mm, and preferably greater than 500 mm. An adjustment region of more than 1000 mm is especially preferable. Therefore, the qualities, especially the wall thickness of the blown film can be varied within a wide range and adapted to the requirements.

An embodiment of the invention provides that the removal elements consist of several materials. They can be built up, for example, in layers. In particular, one layer can extend over the inner edge of another layer and, for example, be wrapped around the latter one. In this case one layer can have a lesser elasticity in order to keep the adjustment paths at a minimum during the adaptation to the distance while the other layer can be soft in order to reduce the friction between the removal element and the blown film so that damage to the blown film can be kept low. Alternatively, even several removal elements which are superposed over each other but independent of each other can be provided.

In an advantageous embodiment of the invention the removal element can be segmented, i.e., it can consist of several individual elements even in the circumferential direction. An iris diaphragm can be cited as an example.

The providing of rubber as the material for a strip-like removal element which has the required qualities and is still permanently stable is especially advantageous.

In order to be able to alter the removal element in its distance a device for the introduction of force is provided which can be introduced at several points, in particular at more than 20 points of the removal element. In particular in conjunction with the embodiment in which an annular, flat strip is provided, this can even out the adjustment forces on its inner circumference so that even the case of a punctiform introduction of force in the region of the outer ends of the brushing-off device the inside diameter can be homogeneously altered, i.e., the circular form is retained.

It is especially advantageous if the device for the introduction of force comprises a plurality of adjustment elements which can be moved or extend at least partially radially outward and which can be loaded with traction, in particular wires or bands. However, poles, rods or the like can also be provided. It is important in particular here to have no or only a slight change in length of the adjusting elements when they introduce a force acting on them into the brushing-off device. In this manner a simple mechanical solution is created for transmitting tractive forces. The introduction of thrust forces is not necessary in particular in conjunction with the embodiment of an elastic ring since the latter as a rule provides return forces on account of the deflection out of the position of rest. The adjustment of the distance of the removal element from the main axis of the blown film can be readily controlled by no change in length or one that is too low.

It is preferable that the adjustment elements are flexible but substantially constant in their length, as is usually the case as a rule with wires or bands. In this manner the entire device for cooling can be compactly built because in case of a "drawing" of the adjusting elements, sections of these adjusting elements can be deflected so that these sections can be transported in another direction than the radial direction.

An especially preferred embodiment of the invention provides that the device for cooling comprises at least one drive which provides an adjusting power for altering the distance of the removal element from the main axis of the blown film. The drive is preferably designed as an electro-drive machine and can therefore provide a precise adjusting power, wherein the drive can be designed to be controlled or regulated in its position.

In another preferred embodiment of the cooling device according to the invention a mechanism for transmitting drive power is provided with which a drive power can be converted into an adjusting power for adjusting the removal element. In particular, it is important here to convert a rotationally provided power into a linearly acting power. Basically, different elements are conceivable here, wherein at least one tractive element such as a cogged belt, a sprocket chain, a toothed rack or another structural component provided with a tooth pitch can be used which can be moved by a cogged gear arranged on the drive and rotationally driven.

An especially preferred embodiment of the invention comprises a mechanism for transmitting drive power which transmits the power provided by a drive in particular directly or via winding drums onto the adjusting elements. The term "directly" means that a single structural component is provided as the mechanism for transmitting drive power on which the adjusting elements are non-positively arranged so that the adjustment elements can be moved upon a movement of this structural component. In an advantageous embodiment winding drums can be driven by the mechanism for transmitting drive power, which drums are capable of winding up the flexible adjustment elements such as, for example, wires, bands or threads so that the drive power can be transmitted by the tractive force acting via these winding drums onto the adjustment elements and therefore onto the brushing-off device.

It is also advantageous if the mechanism for transmitting drive power comprises at least one endlessly rotating power transmission element, in particular a chain or a toothed ring. In particular, a number of toothed gears can be driven with a chain or a toothed ring with a single drive, wherein a winding drum can be driven with each one of the toothed gears. These gears can be distributed over the circumference of the blown film at a distance from the latter in or on the cooling device so that radially acting adjustment forces can be introduced at different positions of the removal element into them.

The cited problem is also solved by the features of claim 16. It provides that upon an altering of the diameter of the blown film, the distance which the removal element has from the main axis of the blown film is altered. The same advantages are achieved here like those already described in conjunction with the device according to the invention.

The problem is additionally solved by a blown film layout comprising a device according to the above description and/or a device according to claims 1 to 15.

A blown film layout according to the invention comprises a lay-flat which follows in the direction of the transport of the blown film of the device for cooling the blown film.

A blown film can be produced in a blown film layout according to the invention whose wall thickness is below 5 mm, especially below 1 mm and preferably below 0.5 mm.

The distance between the extrusion tool and the device for cooling the blown film can be adjusted in a blown film layout according to the invention. To this end the device for cooling the blown film is arranged on a height adjustment device.

In a blown film layout according to the invention the stretching factor, that is, the longitudinal change both in the circumferential direction as well as in the transport direction is preferably at least 2 and/or at the most 100, preferably in the region of 5 to 15. Such a stretching factor leads at the same time to a correspondingly lesser wall thickness of the blown film.

It should be explicitly mentioned again that the problem is also solved by a calibration device comprising a device according to the above description and/or comprises a device according to claims 1 to 15.

Figure 1:
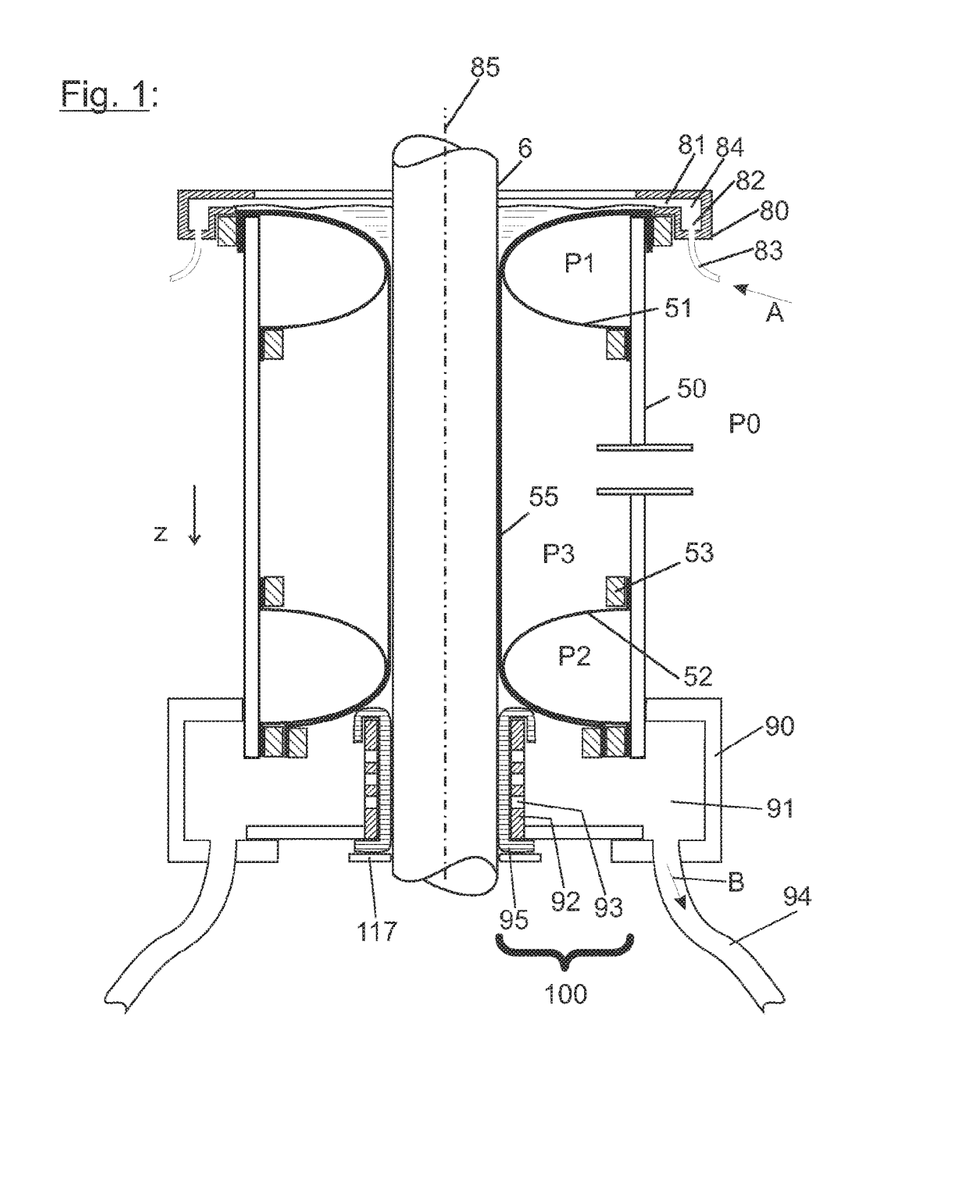
FIG. 1 shows a calibration device.

Other advantages, features and details of the invention are apparent from the following description in which various exemplary embodiments are explained in detail with reference made to the figures. The features mentioned in the claims and in the specification can be essential for the invention individually or in any combinations of mentioned features. Features and details described in conjunction with the method according to the invention in the framework of the entire disclosure naturally also apply in conjunction with the cooling device according to the invention and vice versa so that as regards the disclosure of the individual aspects of the invention, mutual reference is always made and can be made. In the individual figures:

FIG. 1 shows a calibration device 1, wherein in this exemplary embodiment the diameter of the tubular region can be altered.

A ring 80 is provided above the casing 50 and comprises a circumferential opening 81 on its inner surface and surrounds an annular chamber 84. The ring 80 extends over the casing in the radial direction. A circumferential recess 82 is introduced into this part extending over the casing 50 which recess can serve as a liquid reservoir. The liquid is supplied via supply hoses 83 which can advantageously be uniformly distributed over the circumference of the ring, which is indicated by the arrow A. If there is a sufficiently high liquid level inside the ring chamber, the liquid exits out of the circumferential opening 81 and runs into the inlet region between the elastically deformable, tubular region 55 and the blown film 6. A liquid ring is formed here. The blown film entrains aa part of the liquid, wherein the latter cools the blown film. The blown film 6 is transported in transport direction z. The blown film 6 is characterized by its axis of symmetry 85 which is at the same time its main inertial axis or, in brief, its main axis.

In order to be able to remove the liquid again after its cooling action from the blown film a suction removal device 89 is located the tubular region. This device comprises a ring 90 which also forms an annular chamber 91. The inner wall 92 is provided with openings 93 through which the water can be removed by suction from the surface of the blown film. The annular chamber 91 is connected for the removal by suction via one or more hoses 94 to a vacuum source. The suction device is indicated with the arrow B. In order that the blown film 6 is not damaged at the openings 93, the latter are covered with a porous material 95 through which the liquid can pass, which, however, avoids a deformation of the material of the blown film. A fabric, for example, a textile fabric can serve as the porous material. Many of the materials which have suitable qualities for the cited application are conceivable. The inner wall 92, the openings 93 and the material 95 form, taken together, a liquid-permeable element 100.

The liquid can also be removed alternatively to the suction removal device or also additionally to it by a removal element designated as removal device 117 from the outer surface of the blown film. This device is situated in the exemplary embodiment of FIG. 1, viewed in the direction of transport z, behind the suction removal device and behind the tubular region 55.

The device and the method for altering the inside diameter of the tubular region are disclosed in the FIGS. 11 and 12 as well as in the associated specification parts of the publication WO 2012/032128 A1. These sources are considered herewith as being included in this patent application. However, this is only an exemplary embodiment of a calibration device with a tubular region whose diameter can be altered. Even other exemplary embodiments of such a calibration device can advantageously be combined with suction removal devices such as are explained in particular using the FIGS. 2 and 3 in the following specification parts.

Figure 2:
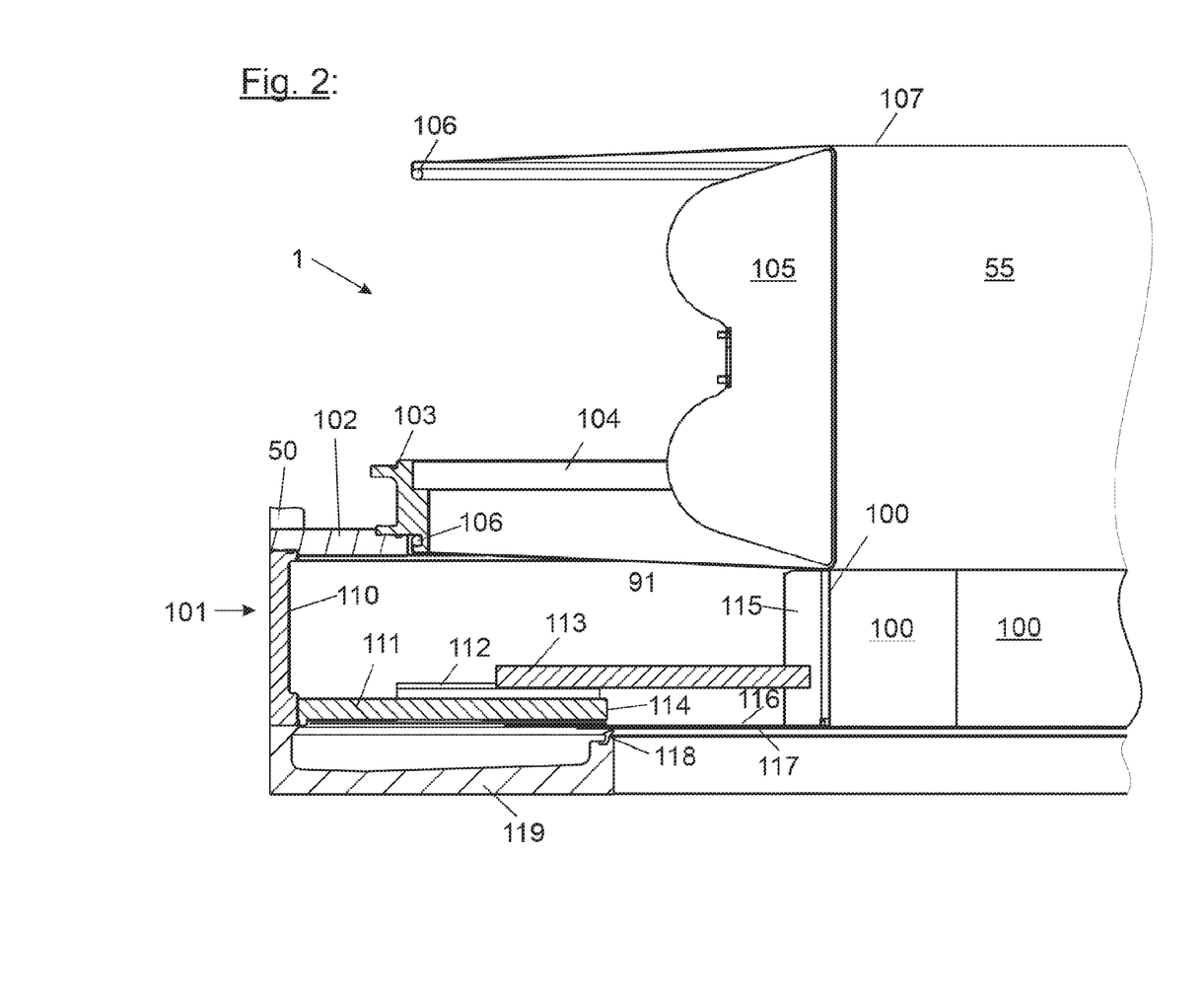
FIG. 2 shows a part of a view through a section of a calibration device according to the invention.

FIG. 2 shows a part of a view through a section of a calibration device 1 according to the invention with a suction removal device 101. The blown film 6 is not shown in this view for the sake of clarity. The casing 50 carries a support ring 102 on its bottom on which an annular body 105 is supported by an intermediate ring 103 and a holding device 104, with which body the diameter of the tubular region 55 can be adjusted, which will not be explained in detail here. The tubular region is preferably formed by a cylinder 107 consisting of a flexible material which is drawn outward from the inner region over the annular body and is fastened by fastening rings 106 to a suitable structural component, here the intermediate ring 103.

A casing attachment 110 is provided below the casing 50 and carries a carrying plate 111 extending inward. A rail 112 is arranged on the carrying plate 111 on which rail the carriage 113 can move especially in the radial direction r of the blown film. The inner wall 114 has such aa large distance from the main axis of the blown film that when adjusting the calibration device to the greatest possible blown film which can be passed with the calibration device, the carrying plate is not a limitation. The carriage 113 carries a support element 115 on its end facing the main axis of the blown film on the inner surface of which element the liquid-permeable element 100 is situated. Several liquid-permeable elements 100 are provided in the exemplary embodiment shown of which two are shown.

In order that an annular chamber can be constructed, at least one sheeting plate 116 is provided underneath each support element 115 and which can be shifted with the support element 115. The sheeting plate is preferably fastened to the support element. The brushing-off device 117, in particular a rubber ring, is arranged underneath the sheeting plate 116 and whose inner edge is arranged to brush off liquid which was not able to be removed by suction by the suction removal device from the outer surface of the blown film. In order that even the inner edge of the rubber ring can be adjusted regarding the distance from the main axis of the blown film, the latter can be expanded in the radial direction, which preferably takes place simultaneously with the adjusting of the distance of the liquid-permeable elements. A circumferential seal 118 is arranged underneath the brushing-off device 117 which seal rests on the one hand in a sealing manner on the flexible ring and on the other hand is let into a groove of the lower closure ring 119. The lower closure ring 119 is fastened to the casing attachment 110.

On the whole, an annular chamber 91 is formed by the described suction removal device which can be loaded with a vacuum for removing the liquid by suction. As a consequence, the brushing-off device 117 is drawn against the at least one sheeting plate, wherein the brushing-off device 117 also rests in particular on the bottom of the liquid-permeable element. Above the liquid-permeable elements 100 the chamber 91 is formed by the cylinder 107, the intermediate ring 103 and the support ring 102. In order to achieve a heightened sealing action the annular body 105 can be supported by its weight force at least partially on the support element 115.

Figure 3:
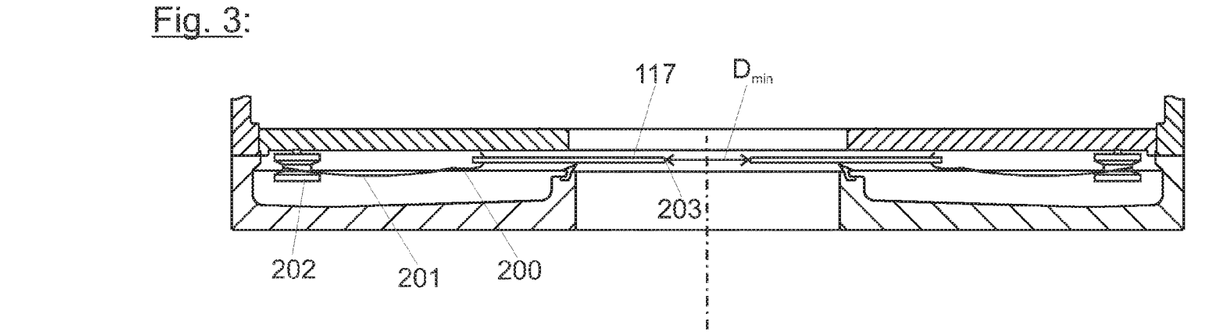
FIG. 3 shows an enlarged view of the brushing-off device in the non-expanded position.

FIG. 3 shows an enlarged lateral view of the brushing-off device 117 which is situated in its unexpanded position. The brushing-off device has an inner edge 203 which is the part of the brushing-off device which has the least distance from the main axis of the blown film. Several draw hooks 200 are arranged in the region of the outer edge of the flexible ring which engage in a hole in the flexible ring. A draw wire 201 is fastened to each draw hook which can be rolled up on a roller 202. The roller advantageously transmits the necessary drawing force onto the draw wire 201. In the unexpanded position the brushing-off device 117 frees an opening for the blown film with the minimum diameter $D_{min}$. This situation becomes clear by the suspended draw wire 201, i.e., the latter noes not exercise any radially outwardly directed drawing force on the brushing-off device.

Figure 4:
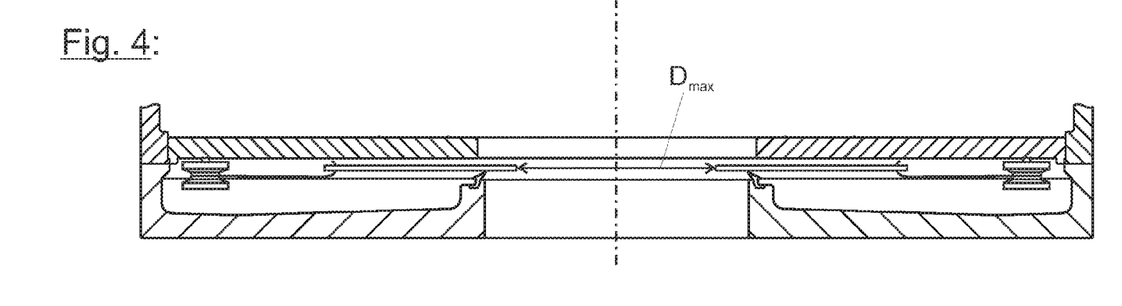
FIG. 4 shows an enlarged view of the brushing-off device in the expanded position.

FIG. 4 shows the situation in which the draw wire 201 exerts a radially outwardly directed drawing force on the brushing-off device. To this end a part of the draw wire 201 is wound onto the roller 202. The winding onto a roller is advantageous here since the drawing stretch of the draw wire can be greater than the increase in the radius of the opening for the blown film caused as a result. Therefore, a compact device is created for altering the distance between the brushing-off device and the main axis of the blown film.

Figure 5:
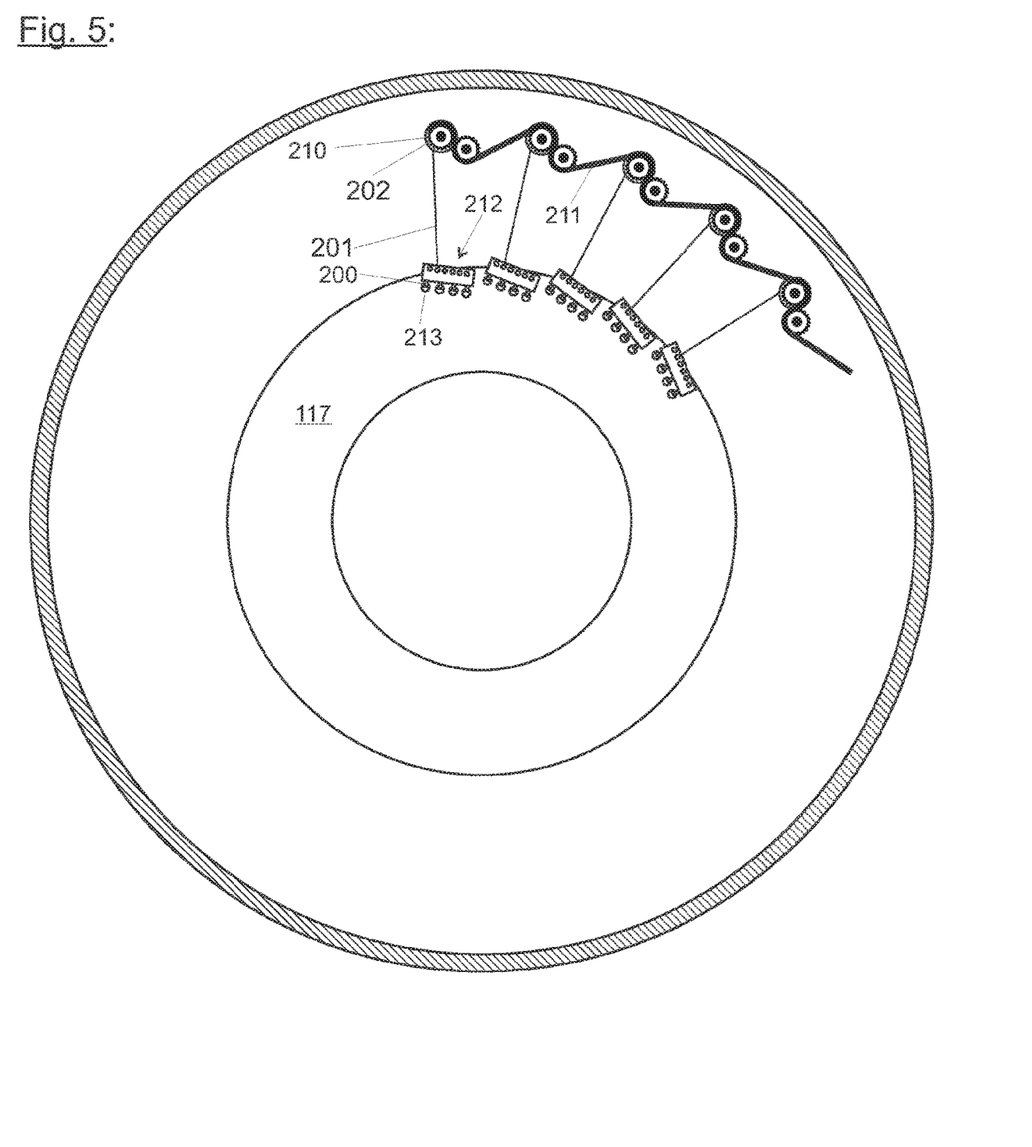
FIG. 5 shows a top view onto the brushing-off device.

FIG. 5 shows a top view onto the brushing-off device, wherein the essential components of a mechanism for transmitting the drive power for transferring a drive force onto the rollers 202 can be seen. The rollers are connected in a non-rotating manner to gears 210 which can be driven by a chain 211. Instead of the chain, even other means for transmitting drive power such as toothed belts, belts, wires or bands which are flexible but substantially non-expandable are conceivable. The chain can be driven by a drive motor, preferably an electromotor, which is not shown. In the exemplary embodiment shown the draw wire 201 is not directly connected to a hook but rather by a drawing device 212 on which several hooks 200 are arranged. Each hook engages into an opening 213 of the brushing-off device 117. As a result of this arrangement, the drawing force which is provided by a single draw wire 201 and is substantially radial can be uniformly distributed onto a curved section of the brushing-off device. This greatly reduces the danger that an opening 213 is torn out.

The openings 213 do not have a constant distance here from the main axis of the blown film but rather are arranged at an angle to the outer edge of the brushing-off device. It is now possible to hold the two adjacent openings of two adjacent drawing devices 212 at a small distance in the circumferential direction of the brushing-off device. This brings it about that this distance does not change or does not change in a disadvantageous manner even under a great drawing force. The drawing devices 212, the rollers and the gears are uniformly distributed over the circumference of the brushing-off device so that substantially the same drawing force directed in the radial direction attacks all openings 213. On the whole, this arrangement brings it about that the punctiform drawing force on the openings leads to a uniform diameter D which is substantially constant at every position of the inner edge 203.

Figure 6:
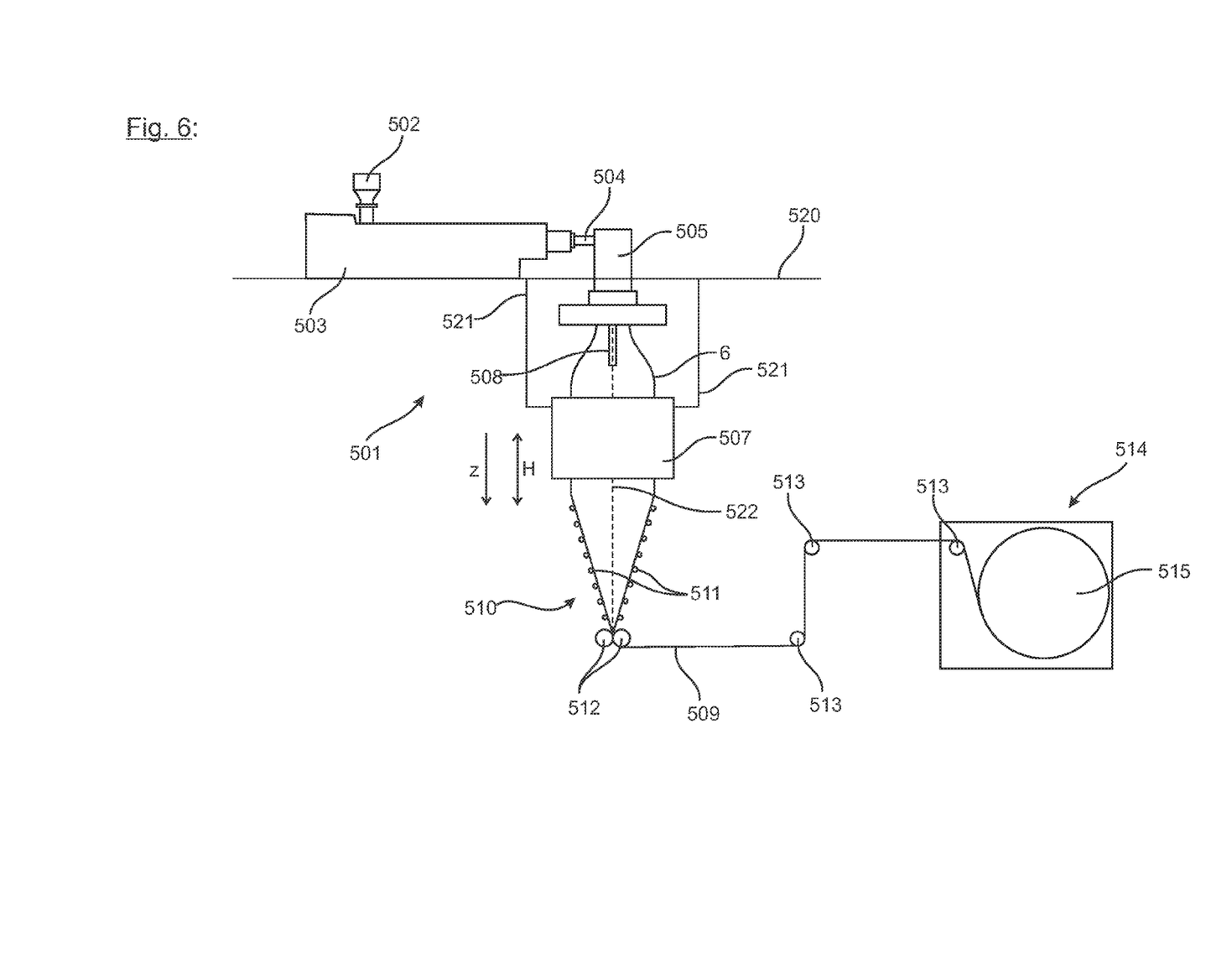
FIG. 6 shows a blown film layout according to the invention.

Finally, FIG. 6 shows a blown film layout 501 according to the invention. A plastic is supplied to the filling-in piece 502 which is then plasticized in the extruder 503. The mass produced is supplied via a connection line 504 to the blow head 505 with which a blown film 6 is formed from the mass. Other extruders can be associated with the blow head 505 so that multilayer films can be produced. The extruders can be arranged on a raised platform 520 on which the blow head 505 is also suspended. A carrying device 521 can also be situated on this platform. This carrying device carries the calibrating basket 507 described in detail further below, wherein the carrying device comprises a height adjustment with which the distance of the calibrating basket 507 to the blowing head can be adjusted. The situation is clarified by the double arrow H.

The blown film 6 leaves the blowing head in the transport direction z through an annular nozzle not visible in this view. The interrupted line 522 shows the axis of symmetry of the blown film 6.

The blown film 6 is present at first upon leaving the blow head 5 as a film bubble in which a slightly elevated inner pressure is present opposite the ambient pressure. This is achieved by the supplying of compressed air through the blower piece 508. As a result of the elevated inner pressure, the still not yet solidified material of the blown film 6 widens out. Finally, the diameter of the finished blown film 6 as well as the thickness of the film material is adjusted in this manner.

Subsequently, the not yet solidified film bubble 6 passes into the calibration and/or cooling device designated as calibrating basket 507. The diameter of the blown film is limited here. The blown film cools down inside the calibrating basket 507 to a temperature at which a subsequent deformation is no longer possible or only still possible by using greater forces. The position at which this phase transition takes place is often designated as the "frost line".

| List of reference numerals | |
|---|---|
| 1 | Calibrating device |
| 6 | Blown film |
| 50 | Casing |
| 55 | Elastically deformable, tubular region |
| 80 | Ring |
| 81 | Opening |
| 83 | Supply hoses |
| 84 | Annular chamber |
| 85 | Axis of symmetry |
| 89 | Suction removal device |
| 90 | Ring |
| 91 | Annular chamber |
| 92 | Inner wall |
| 93 | Opening |
| 94 | Hose |
| 95 | Porous material |
| 100 | Liquid-permeable element |
| 101 | Suction removal device |
| 102 | Support ring |
| 103 | Intermediate ring |
| 104 | Holding device |
| 105 | Annular body |
| 106 | Fastening ring |
| 107 | Cylinder |
| 110 | Casing attachment |
| 111 | Carrying plate |
| 112 | Rail |
| 113 | Carriage |
| 114 | Inner wall |
| 115 | Support element |
| 116 | Sheeting plate |
| 117 | Brushing-off device |
| 118 | Circumferential seal |
| 119 | Lower closure ring |
| 200 | Draw hook |
| 201 | Draw wire |
| 202 | Roller |
| 203 | Inner edge |
| 210 | Gear |
| 211 | Chain |
| 212 | Drawing device |
| 213 | Opening |

The invention claimed is:

1. A device for cooling a blown film, with a device for applying liquid onto the outer wall of the blown film, wherein the film can be cooled with the liquid, wherein the liquid can be introduced between a tubular region and the blown film, wherein the blown film can be transported in a transport direction (z), with a single removal element for removing at least a part of the liquid from the blown film, wherein the removal element comprises an annular, flat strip consisting of an elastic material, and discrete points that surround at least parts of the blown film in the circumferential direction, wherein the removal element, viewed in the transport direction (z) is situated behind the tubular region, and upon encountering an alteration of the diameter of the blown film, the distance which the removal element has from the main axis of the blown film can be altered accordingly by a force introduction device that attacks the discrete points with outwardly directed radial forces such that liquid continues to be removed, wherein the removal element maintains a circumferential, uninterrupted circular edge facing the outer surface of the blown film via the elasticity of the elastic material.

2. The device according to claim 1, wherein the device for applying liquid comprises at least one film guide element with at least one inner wall which is arranged at least partially around the blown film and along which the blown film can be passed.

3. The device according to claim 1, wherein a liquid reservoir is provided above or in the upper region of the film guide element and with which the liquid can be provided, wherein the liquid can be guided between the film guide element and the blown film.

4. The device according to claim 1, wherein the removal element is situated underneath the at least one film guide element.

5. The device according to claim 1, wherein a suction removal device is situated, viewed in the direction of transport of the blown film, between the at least one film guide element and the removal element and with which the liquid can be removed at least partially from the outer wall of the blown film.

6. The device according to claim 1, wherein the removal device comprises an annular, flat strip consisting of a rubber material.

7. The device according to claim 1, wherein the device comprises a drive which provides an adjustment force for altering the distance.

8. The device according to claim 1, wherein the force introduction device comprises a plurality of adjustment elements comprising wires or bands which can be moved radially outward and which can be loaded with traction.

9. The device according to claim 8, wherein the adjustment elements are flexible and substantially constant in their length.

10. The device according to claim 1, wherein a mechanism for transmitting drive power is provided with a drive power which can be converted into an adjustment force for adjusting the removal element.

11. The device according to claim 10, wherein the mechanism for transmitting drive power transmits the drive power directly or via winding rollers onto the adjustment elements.

12. The device according to claim 10, wherein the mechanism for transmitting drive power comprises at least one endlessly rotating power transmission element.

13. The device according to claim 12, wherein the endlessly rotating power transmission element comprises a chain.

14. The device according to claim 12, wherein the endlessly rotating power transmission element comprises a ring.

15. A method for cooling a blown film, in which a liquid is applied onto the outer wall of the blown film by a device for applying liquid, wherein the film is cooled with the liquid, wherein the liquid is introduced between a tubular region and the blown film, wherein the blown film is transported in a transport direction (z), with a single removal element for removing at least a part of the liquid from the blown film, wherein the removal element comprises an annular, flat strip consisting of an elastic material, and discrete points that surround at least parts of the blown film in the circumferential direction, wherein the removal element, viewed in the transport direction (z), is situated behind the tubular region, and wherein upon encountering an alteration of the diameter of the blown film, the distance which the removal element has from the main axis of the blown film is altered accordingly by a force introduction device that attacks the discrete points with outwardly directed radial forces such that liquid continues to be removed, wherein the removal element maintains a circumferential, uninterrupted circular edge facing the outer surface of the blown film via the elasticity of the elastic material.

* * * * *